United States Patent [19]

Gomes

[11] Patent Number: 4,616,953
[45] Date of Patent: Oct. 14, 1986

[54] KNOCK DOWN PIVOT FASTENER

[76] Inventor: Daniel Gomes, P.O. Box 117, Worcester, N.Y. 12197

[21] Appl. No.: 781,030

[22] Filed: Sep. 27, 1985

[51] Int. Cl.⁴ .................... B25G 3/00; F16D 1/00
[52] U.S. Cl. .................... 403/407.1; 411/510; 24/662
[58] Field of Search ............ 403/298, 407.1, 406.1, 403/405.1, 299; 411/508, 509, 510; 24/662, 681, 694, 297, 621

[56] References Cited

U.S. PATENT DOCUMENTS 3,551,963  1/1971  Mosher et al. .............. 24/662 X
4,059,041 11/1977  Hasson ....................... 24/694 X
4,122,583 10/1978  Grittner et al. ............ 411/510 X

FOREIGN PATENT DOCUMENTS 1316472  5/1973  United Kingdom .......... 24/681

Primary Examiner—Andrew V. Kundrat
Attorney, Agent, or Firm—Woodard, Weikart, Emhardt & Naughton

[57] ABSTRACT

A pivot fastener construction useful in coupling two parts. The pivot fastener prevents unwanted separation of the parts coupled while permitting the parts to rotate relative to each other. The blind pivot fastener has bushing members which can be secured in fixed relationship to the parts coupled by threading, press fitting, expansion fitting or the like. The advantages of the construction may be utilized in both assembled and unassembled pivot fasteners. By changing specific aspects of the design, such as assembled/unassembled, means of securing the bushing members, use of a separate bearing post member, etc. the specific construction may be altered in response to specific application needs.

20 Claims, 6 Drawing Figures

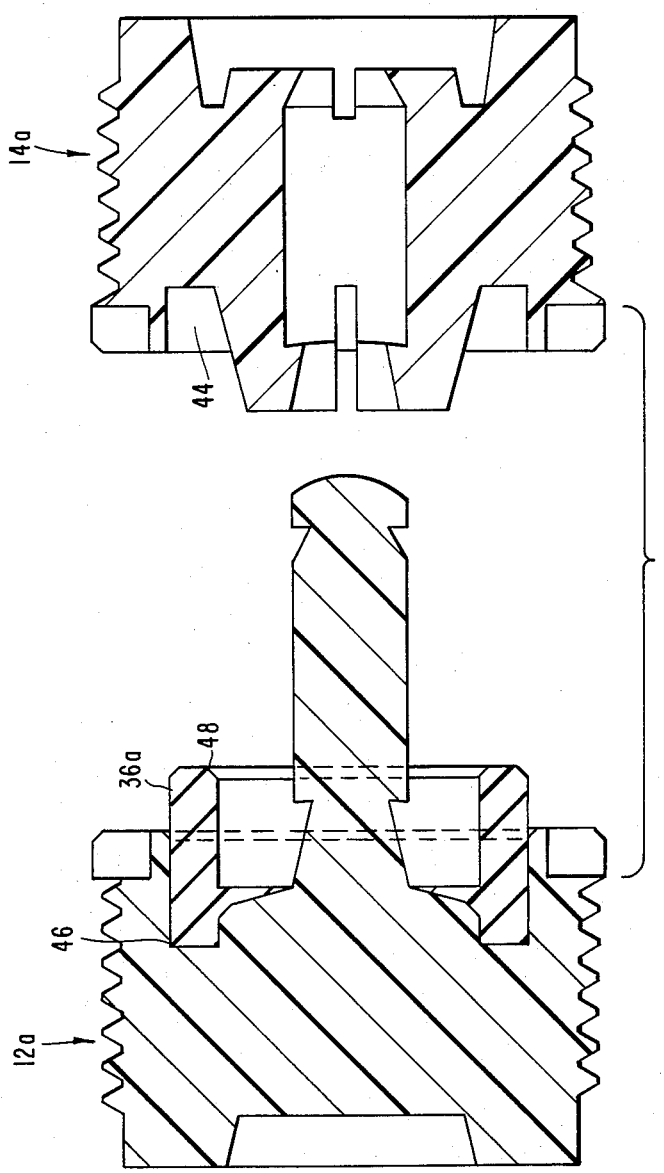

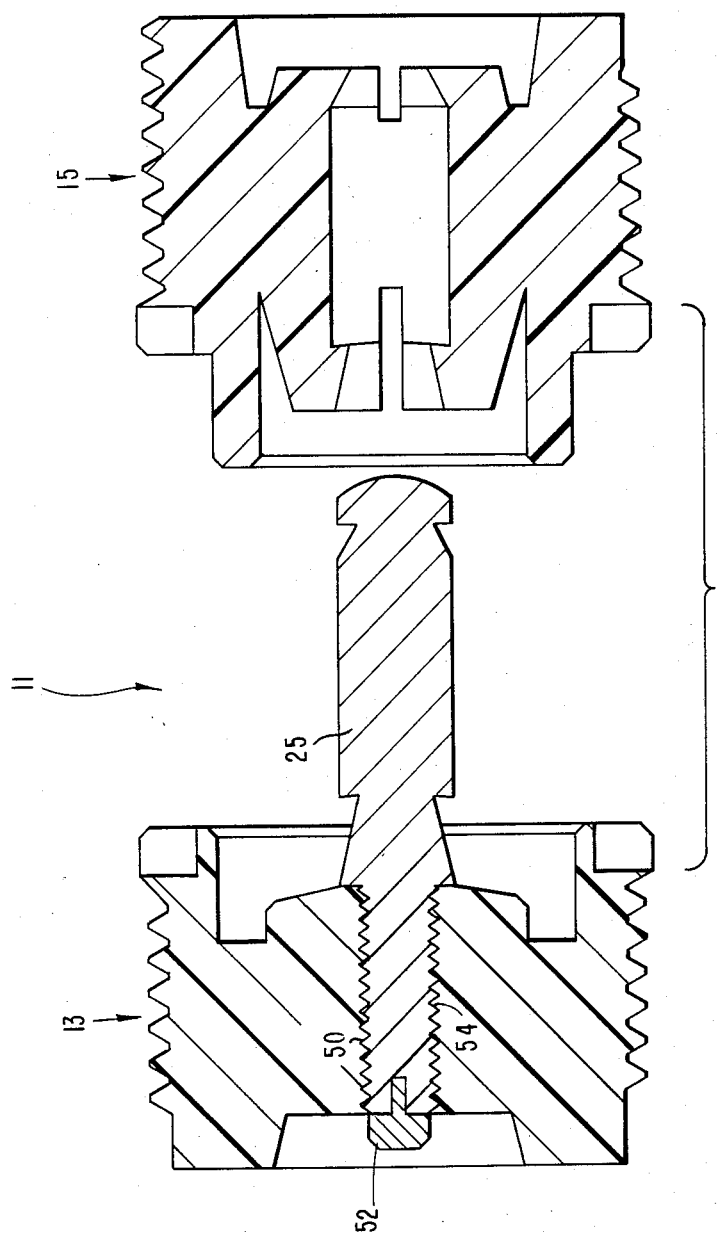

KNOCK DOWN PIVOT FASTENER

BACKGROUND OF THE INVENTION

This invention relates generally to the field of fasteners and more specifically to a pivot fastener construction useful in coupling a first part to a second part while permitting relative rotation therebetween.

The use of fasteners, hinges and joints which permit pivotal movement is well known. The present invention relates to a pivot fastener useful for coupling two objects, such as multi-piece, knock down type (K-D) furniture assemblies or the like. In the past, K-D fasteners tended to separate easily when they were subjected to sufficient lateral force. Another tendency of past K-D fasteners has been that they frequently suffer from "sloppiness", i.e., motion of the coupled objects transverse to the axis of the fastener joining them and which results in the fastener suffering uneven and undue wear when it is subjected to stress.

A principal challenge confronted and met in this invention has been to develop a blind pivot fastener that will not unwantingly separate when subjected to normal forces and conditions and which will minimize the problems of uneven and undue wear associated with sloppiness.

SUMMARY OF THE INVENTION

One embodiment of the invention is a pivot fastener useful in coupling a first part to a second part including a first bushing member and a second bushing member. The first first bushing member has an outer surface with means for securing the first bushing member in fixed relationship to the first part. The first bushing member has a mating face including a circumferential locking sleeve and an axially extending bearing post member with a bearing end and a first circumferential retaining flange. The second bushing member has an outer surface with means for securing the second bushing member in fixed relationship to the second part. The second bushing member also has a mating face with a circumferential locking collar sized to fit and engage within the locking sleeve of the first bushing member. In addition, the second bushing member has an axially extending opening for receiving the bearing end of the bearing post member therethrough. The opening has a mating bearing surface and a reduced diameter portion for engaging with the first retaining flange in snap-fit relationship to prevent separation of the first and second bushing members when the bearing post member is received therein and the locking collar is positioned within the locking sleeve while also permitting relative rotation therebetween.

It is an object of the invention to provide an improved pivot fastener.

Another object of the present invention is to provide a knock-down type pivot fastener that can be used as a blind connection between parts being coupled.

Yet another object of the present invention is to provide a pivot fastener which can alternatively be designed to be permanently interlocking or to be taken apart and reused.

A further object of the present invention is to provide a pivot fastener that reduces manufacturing and production costs.

Still another object of the present invention is to provide a pivot fastener that permits use of new options in means for securing the fastener in place.

Further objects and advantages of the invention will be apparent from the following detailed description taken in conjunction with the appended claims.

BRIEF DESCRIPTION OF THE DRAWINGS

FIG. 1A is an enlarged, sectional view of a pivot fastener, prior to interlocking, in which the locking collar comprises a part, separate and distinct from the bushing members, according to a typical embodiment of the present invention.

FIG. 2 is an enlarged, sectional view of a pivot fastener, prior to interlocking, having a statically attached bearing post member according to a typical embodiment of the present invention.

DESCRIPTION OF THE PREFERRED EMBODIMENT

Figure 1:
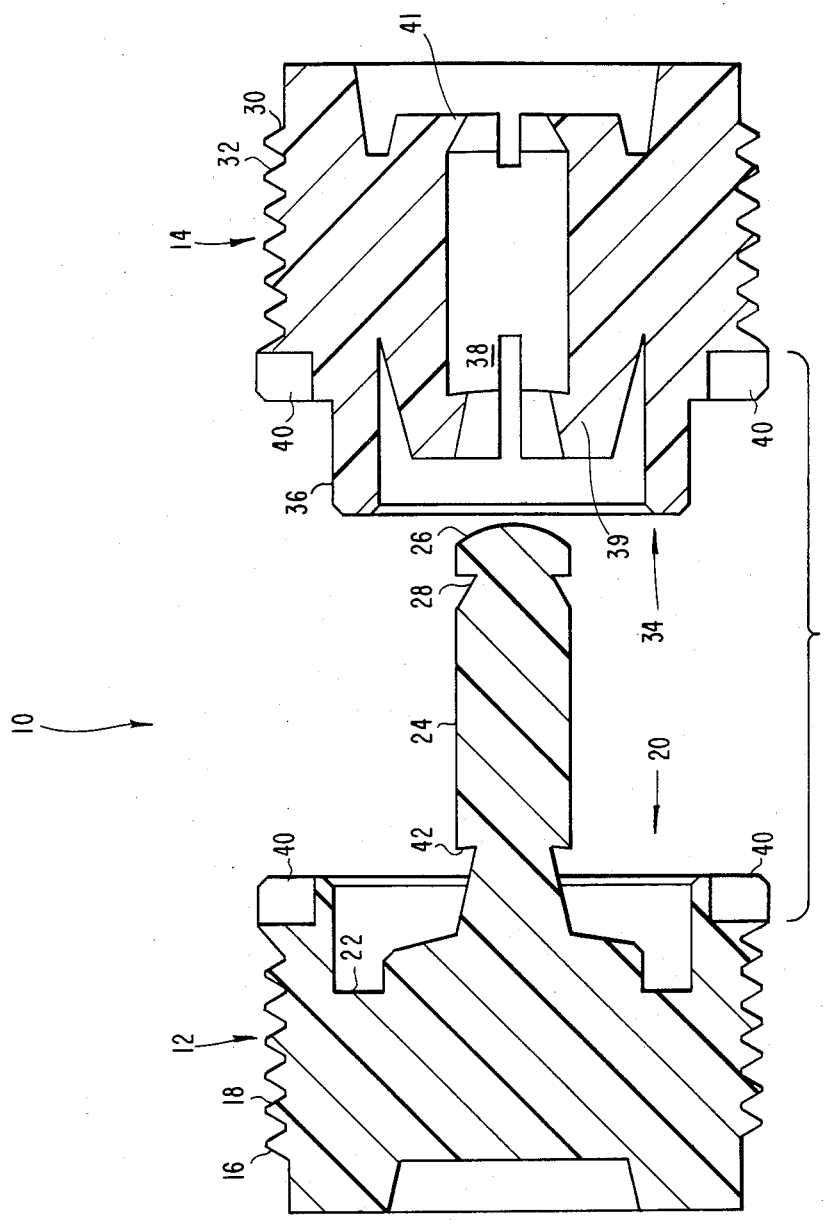
FIG. 1 is an enlarged, sectional view of a pivot fastener, prior to interlocking, according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated as would normally occur to one skilled in the art to which the invention relates are herein incorporated.

Referring to FIG. 1, there is illustrated pivot fastener 10 which includes first bushing member 12 and second bushing member 14. Outer surface 16 of first bushing member 12 is threaded. Threading 18 permits first bushing member 12 to be secured in fixed relationship to the first part (not illustrated) which is sought to be joined. Mating face 20 of first bushing member 12 includes circumferential locking sleeve 22 and axially extending bearing post member 24. Bearing post member 24 has bearing end 26 and a first circumferential retaining flange 42.

Outer surface 30 of second bushing member 14 is threaded. Threading 32 permits second bushing member 14 to be secured in fixed relationship to the second part (not illustrated) which is sought to be joined. Mating face 34 of second bushing member 14 includes integral circumferential locking collar 36 and axially extending opening 38. Opening 38 receives bearing end 26 of bearing post member 24 therethrough. Reduced-diameter portion 39 of second bushing member 14 engages with first retaining flange 42 in a snap-fit relationship creating a primary locking mechanism preventing separation of first bushing member 12 from second bushing member 14 once bearing post member 24 is inserted therein while also permitting first bushing member 12 to rotate relative to second bushing member 14. It is understood that the pivot fastener of the present invention can be used to provide a blind connection between the parts being coupled.

Locking collar 36 engages with locking sleeve 22 creating an auxiliary locking mechanism which is useful in preventing "sloppiness," e.g., motion of the fastener components, bushing members 12 and 14, in a direction transverse to that of axially extending bearing post member 24. In fastneer design where the primary locking mechanism reduces the useable bearing length and surface area and where smallness, in terms of overall fastener length and diameter, is sought, the auxiliary locking mechanism helps serve to increase the effective bearing length and diameter without increasing the overall length and diameter of the pivot fastener. Furthermore, the auxiliary locking mechanism assures a more even wear of the primary locking mechanism, thus adding to the stability, strength and reliability of the fastener.

The bushing members each have a number of slots 40 to permit a conventional driving tool to be utilized in the positioning of the bushing members in the respective parts to be coupled. Bushing members 12 and 14 are shown each with four driving tool slots. It is understood, however, that bushing members without driving tool slots, as well as bushing members having greater or fewer than four driving tool slots may be used in the pivot fastener of the present invention.

In FIG. 1 bearing post member 24 is shown with first retaining flange 42, near its base, and second retaining flange 28, near its bearing end. It is noted that either retaining flange, alone, in engagement with reduced-diameter portions 39 and 41, respectively, may be sufficient to prevent separation of the bushing members. It is understood that by changing the angle at which the retaining flanges engage with the opening, the pulling force required to disassemble the fastener can be altered and that the fastener can be designed to permit disassembly to be quickly and easily accomplished when desired.

It is also understood that the locking collar may comprise a part, separate and distinct from the first and second bushing members. In FIG. 1A, locking collar 36a is shown as a separate part and second bushing member 14a is shown as having circumferential locking sleeve 44. Locking collar 36a has lead end 46 designed and arranged for engaging with the locking sleeve of first bushing member 12a and back end 48 designed and arranged for engaging with the locking sleeve 44 of second bushing member 14a.

Referring to FIG. 2, pivot fastener 11 is illustrated as having bearing post member 25 statically attached to first bushing member 13 rather than formed as a part of it. The interaction of first bushing member 13 with second bushing member 15 is otherwise similar to the interaction of the first and second bushing members described above. Bearing post member 25 has an anchor portion 50 with anchor end 52. Bushing member 13 has axially extending aperture 54 for receiving anchor portion 50 of the bearing post member. Aperture 54 engages anchor portion 50 preventing separation of bearing post member 25 from bushing member 13. Bearing post member 25 is shown as threaded into bushing member 13 but it is understood that other means of attaching bearing post member to the bushing member, such as press fitting or knurled surfaces, are also contemplated.

Figure 3:
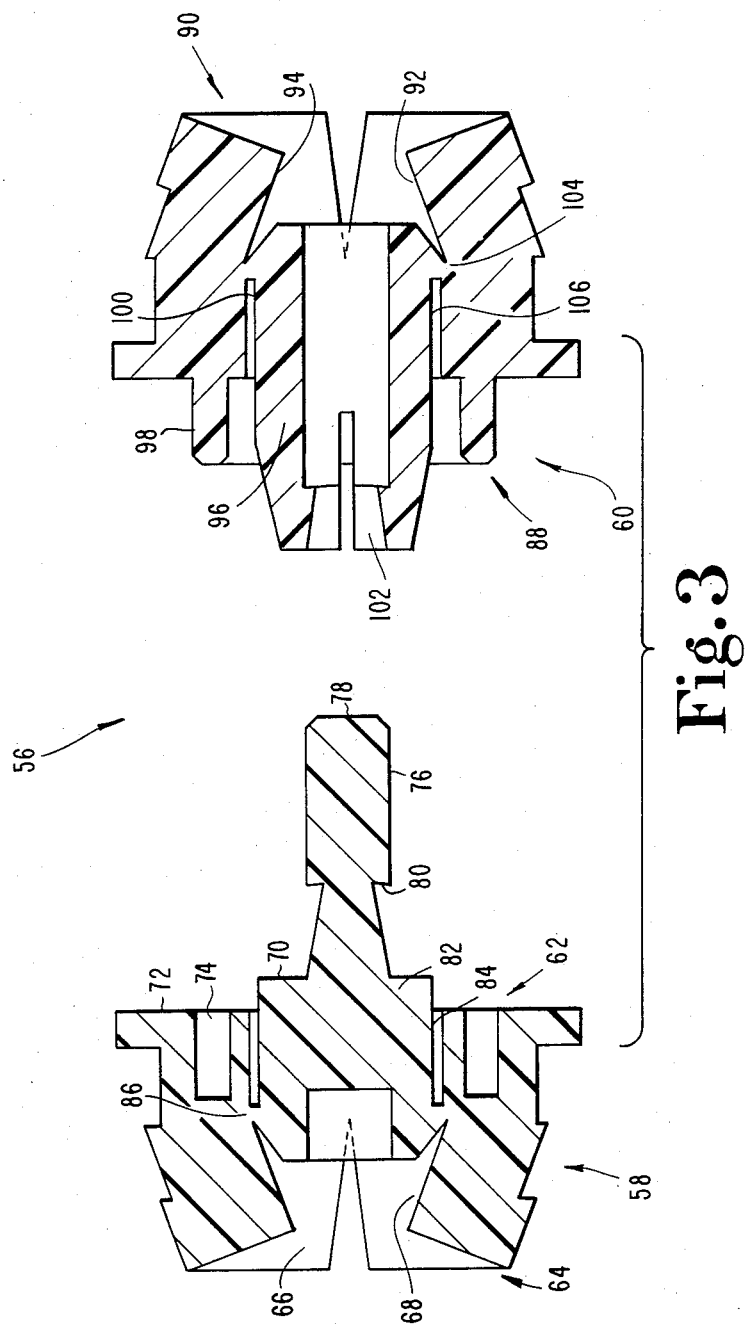
FIG. 3 is an enlarged, sectional view of a pivot fastener, prior to interlocking, in which each bushing member has an expandable, one-piece design according to a typical embodiment of the present invention.

Referring to FIG. 3, there is illustrated pivot fastener 56 which is useful in coupling a first part (not illustrated) with a first bore to a second part (not illustrated) with a second bore. Pivot fastener 56 includes bushing members 58 and 60. Bushing member 58 includes mating face portion 62 and lead end portion 64. Lead end portion 64 is sized to permit insertion of bushing member 58 into the bore of one of the parts to be fastened. Lead end portion 64 has axially extending aperture 66 with knurled surface 68. The mating face portion 62 includes central bearing post section 70 and circumferential collar section 72. Collar section 72 includes circumferential locking sleeve 74. Bearing post section 70 includes axially extending bearing post member 76 having bearing end 78, circumferential retaining flange 80 and adjacent base portion 82 with knurled outer surface 84. Mating face portion 62 has sleeve 86 which detachably connects bearing post section 70 to collar section 72. Sleeve 86 detaches to permit bearing post section 70 to advance through aperture 66, expanding lead end portion 64 to secure bushing member 58 in fixed relationship in the first bore.

Bushing member 60 includes mating face portion 88 and lead end portion 90. Lead end portion 90 is sized to permit insertion of bushing member 60 into the bore of the other part to be fastened. Lead end portion 90 has axially extending aperture 92 with knurled surface 94. Mating face portion 88 includes central bearing post receiving section 96 and circumferential locking collar section 98. Bearing post receiving section 96 has a knurled outer surface 100. Bearing post receiving section 96 also has axially extending opening 102 for receiving bearing post lead end 78. Opening 102 engages retaining flange 80 preventing separation of bushing member 58 from bushing member 60 once bearing post member 76 is inserted therein, while also permitting bushing member 58 to rotate relative to bushing member 60. Mating face portion 88 has a sleeve 104 detachably connecting bearing post receiving section 96 to locking collar section 98. Sleeve 104 detaches permitting bearing post receiving section 96 to advance through aperture 92, expanding lead end portion 90 to secure bushing member 60 in fixed relationship in the second bore.

Bushing members 58 and 60 are of a design which allows for one piece construction. The one piece construction of expandable bushing members eliminates the need for a separate wedge devices to produce the expansion of the bushing member. By reducing the number of parts required, the pivot fastener design disclosed can be less costly to produce.

Figure 4:
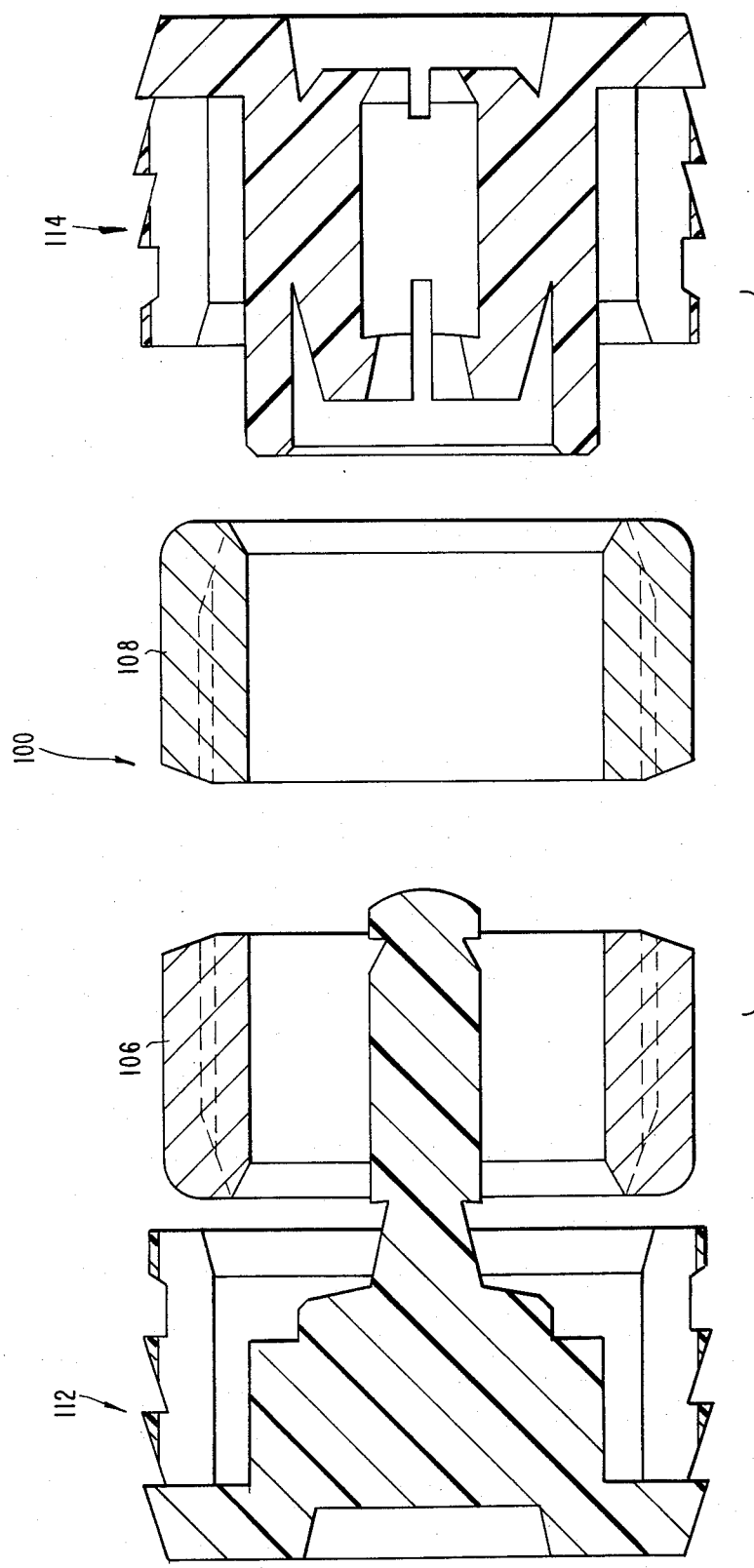
FIG. 4 is an enlarged, exploded, sectional view of a pivot fastener, prior to interlocking, having bushing members expandable by a separate wedge according to a typical embodiment of the present invention.

In FIG. 4, there is illustrated pivot fastener 100 having bushing members 112 and 114 which are expandable. Bushing members 112 and 114 are inserted in bores in the respective parts (not illustrated) to be coupled. Wedges 106 and 108 are used to expand the bushings in place, securing the respective bushing member in fixed relationship to the respective part to be coupled. It is to be understood that wedges of identical design may be used to expand each of the bushing members and that wedges can be manufactured with different tolerances to accommodate a wider variety of materials to be coupled. A wedge-in design also allows for automated insertion of bushing members. The expansion of bushing members already in place in their respective bores does not require the same high degree of design precision required of bushing members which expand during insertion.

Figure 5:
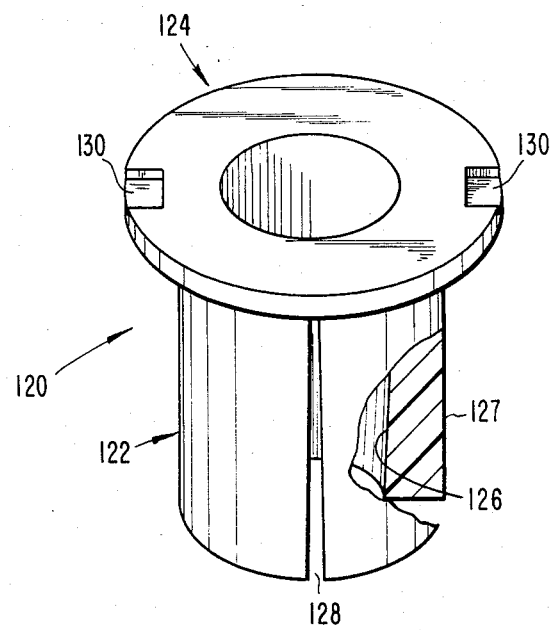
FIG. 5 is an enlarged, fragmentary, sectional view of an insert according to a typical embodiment of the present invention.

The pivot fastener of the present invention can also be used in conjunction with inserts which are placed into prepared bores in the pieces to be joined. In FIG. 5, there is illustrated an insert 120 having body portion 122 and flange portion 124. Body portion 122 has tapered slot 128 which extends up to the bottom of flange portion 124 and an inner surface 126 which tapers so that when a bushing member of a fastener is inserted into the insert, the insert will expand to snugly fit within the subject bore. Body portion 122, being constructed of a reasonably soft material such as a soft plastic, has an unthreaded inner surface 126 which may have threading subsequently cut into it by action of the bushing member being inserted therein. Alternatively, the inner surface of the body portion of the insert can be prepared so as to be threaded prior to the insertion of the bushing member therein. Such an alternate design is especially useful when the insert is made of a relatively hard material that cannot have threading easily cut therein.

Flange portion 124 has two tool indentations 130 permitting the use of a conventional driving tool in positioning the insert into the respective bore of the part to be coupled. The outer surface 127 of body portion 122, may in addition, be textured so as to facilitate securing the insert within the bore of the part to be coupled. For example, an insert with ribs on its outer surface can be used when the insert is to be manually inserted.

The use of inserts with the pivot fastener of the present invention permits the use of a threaded pivot fastener to couple pieces made of material too hard to be threaded, such as oak. Thus, the use of an insert facilitates machine automated placement of the fastener into the bore in the piece to be joined. In addition, the use of insert of various sizes permits the use of the same size fastener to join pieces having bores of dissimilar sizes.

It is understood that the opening of the second bushing member which interacts with the retaining flange or flanges may have a design of a conventional nature, permitting the pivot fastener to be taken apart. This is especially practical when the fastener is situated in a location where it will not be subjected to substantial stress. Fasteners that are taken apart can in turn be reused.

The pivot fasteners described above are designed to permit insertion and securement of each bushing member in a respective part to be coupled prior to the interlocking of the bushing members that results upon assembly. The use of pivot fasteners in an unassembled state (i.e. preinterlocking) results in numerous manufacturing advantages. The user is no longer limited to securing means which are highly material-sensitive, i.e., techniques such as gluing or force-fitting, as was common with prior fasteners of this general nature. The use of unassembled pivot fasteners permits the use of securing means such as threading on the outer surface of the bushing members. The manufacturer is also presented with a number of options as to the assembly of the fastener; for example, the use of threaded bushings permits the positioning and fastening of the fastener to be done automatically by a machine or in the alternative allows for designs in which the fastening is done by the ultimate user. Factors such as a construction with fewer parts and the elimination of the need to assemble the fastener prior to use reduce the expenses of the manufacture and production and in turn may permit the manufacturer to sell his product at a lower cost to the consumer.

While the invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A pivot fastener useful in coupling a first part to a second part, comprising:
   a first bushing member having an outer surface with means for securing said first bushing member in fixed relationship to a first part, said first bushing member also having a mating face including a circumferential locking sleeve and an axially extending bearing post member with a bearing surface and a first circumferential retaining flange; and,
   a second bushing member having an outer surface with means for securing said second bushing member in fixed relationship to a second part, said second bushing member also having a mating face including a circumferential locking collar sized to fit and engage within the locking sleeve and an axially-extending opening for receiving the bearing end of the bearing post member therethrough, the opening having a mating bearing surface and a reduced diameter portion for engaging the first retaining flange in a snap-fit relationship for preventing separation of said first and second bushing members when the bearing post member is received therein and the locking collar is positioned within the locking sleeve while also permitting relative rotation therebetween.

2. The pivot fastener of claim 1 wherein said first and second bushing members each additionally include one or more tool slots in their mating faces for permitting driving of said members into prepared bores in their respective first and second parts.

3. The pivot fastener of claim 1 wherein the bearing post member is elongated and extends substantially through said second member when inserted through the opening therein, the bearing surface on the post member comprising a substantial length thereof and further being generally cylindrically shaped in axial cross section and having a substantially constant radius throughout its length.

4. The pivot fastener of claim 3 wherein the first retaining flange is positioned near the base of the post member and the self engaging reduced diameter portion of the opening is positioned correspondingly therein.

5. The pivot fastener of claim 1 wherein said bearing post member additionally includes a second circumferential retaining flange and said opening in said second bushing member includes a second reduced diameter portion for engaging the same to further resist separation of said first and second bushing members once engaged while continuing to permit relative rotation therebetween.

6. The pivot fastener of claim 1 wherein said locking collar is independent of both said first and second bushing members, the mating faces thereof including first and second circumferential locking sleeves into which said collar is positioned when said members are engaged thereby providing a secondary locking and stabilizing attachment between said members.

7. The pivot fastener of claim 1 useful in coupling a first part with a first bore to a second part with a second bore additionally including inserts placed in each of the respective bores, said inserts having means by which said inserts are secured to the respective parts and means by which said bushing members are secured to said inserts.

8. The pivot fastener of claim 2 wherein said securing means for said first and second bushing members includes a portion of the outer surfaces thereof being threaded for cutting into and gripping the walls of prepared bores in their respective first and second parts thereby fixing said members therein.

9. The pivot fastener of claim 2 wherein said securing means for said first and second bushing members includes a portion of the outer surfaces thereof being textured for being press fit into prepared holes in their respective first and second parts thereby fixing said members therein.

10. A pivot fastener useful in coupling a first part to a second part, comprising:
a bearing post member, having an anchoring portion and a bearing portion, said bearing portion including a bearing surface and a first circumferential retaining flange;
a first bushing member, having an outer surface with means for securing said first bushing member in fixed relationship to a first part, said first bushing member also having a mating face including a circumferential locking sleeve and an axially-extending opening for receiving the anchor portion of said post member in a locking relationship preventing separation thereof or relative rotation therebetween; and,
a second bushing member having an outer surface with means for securing said second bushing member in fixed relationship to a second part, said second bushing member also having a mating face including a circumferential locking collar sized to fit and engage within said locking sleeve and an axially-extending opening for receiving the bearing portion of said bearing post member therethrough, said opening having a mating bearing surface and a reduced diameter portion for engaging said first retaining flange in a snap-fit relationship for preventing separation of said first and second bushing members when the bearing post member is received therein and the locking collar is positioned within the locking sleeve while also permitting relative rotation therebetween.

11. The pivot fastener of claim 10 wherein said first bushing member and said second bushing member each additionally comprise one or more driving tool slots.

12. The pivot fastener of claim 10 wherein said bearing post member additionally comprises a second circumferential retaining flange and said opening of said second bushing member engages said first and second retaining flanges preventing separation of said first bushing member from said second bushing member once said bearing post member is inserted therein while also permitting said first bushing member to rotate relative to said second bushing member.

13. The pivot fastener of claim 10 wherein said locking collar comprises a part separate and distinct from said first and second bushing members and said mating face of said second bushing member additionally comprises a second circumferential locking sleeve, said locking collar having a lead end for engaging said first locking sleeve and a back end for engaging said second locking sleeve.

14. The pivot fastener of claim 10 wherein said outer surfaces of said first and second bushing members have texture means for press fit securing of said first bushing member in fixed relationship to said first part and said second bushing member in fixed relationship to said second part.

15. A pivot fastener useful in coupling a first part with a first bore to a second part with a second bore, comprising;
a first bushing member, said first bushing member having a first mating face portion and a first lead end portion, said first lead end portion having an expanded state and an unexpanded state, said first lead end portion sized for insertion into said first bore and having an axially extending first aperture with a knurled surface, said first mating face portion including a central bearing post section and a circumferential ring section, said ring section including a circumferential locking sleeve, said bearing post section including an axially extending bearing post member having a bearing end with a first circumferential retaining flange and an adjacent base portion with a knurled outer surface, said first mating face portion having a first sleeve detachably connecting said bearing post section to said ring section, said first sleeve detaching permitting said bearing post section to advance through said first aperture and expanding said first lead end portion securing said first bushing member in fixed relationship in said first bore, the surface of said first aperture engaging with said base portion preventing separation of said bearing post section from said ring section; and,
a second bushing member, said second bushing member having a second mating face portion and a second lead end portion, said second lead end portion having an expanded state and an unexpanded state, said second lead end portion sized for insertion into said second bore and having an axially extending second aperture with a knurled surface, said second mating face portion including a central bearing post receiving section and a circumferential locking collar section, said bearing post receiving section having a knurled outer surface, said bearing post receiving section having an axially extending opening for receiving said bearing end of said bearing post member, said opening engaging said first retaining flange preventing separation of said first bushing member from said second bushing member once said bearing post member is inserted therein while also permitting said first bushing member to rotate relative to said second bushing member, said locking collar section engaging said locking sleeve, said second mating face portion having a second sleeve detachably connecting said bearing post receiving section to said locking collar section, said second sleeve detaching permitting said bearing post receiving section to advance through said second aperture expanding said second lead end portion and securing said second bushing member in said second bore, said second aperture engaging said bearing post receiving section preventing separation of said bearing post receiving section and said locking collar section.

16. The pivot fastener of claim 15 wherein said bearing post member additionally comprises a second circumferential retaining flange and said opening of said second bushing member engages said first and second retaining flanges preventing separation of said first bushing member from said second bushing member once said bearing post member is inserted therein while also permitting said first bushing member to rotate relative to said second bushing member.

17. A pivot fastener useful in coupling a first part with a first bore to a second part with a second bore comprising;
   a first bushing member, said first bushing member having an expanded state and an unexpanded state, said first bushing member having a first lead end sized for insertion into said first bore, said first bushing member in said expanded state securing said first bushing member in said first bore, said first bushing member also having a mating face including a circumferential locking sleeve and an axially extending bearing post member with a bearing end and a first circumferential retaining flange; and
   a second bushing member, said second bushing member having an expanded state and an unexpanded state, said second bushing member having a second lead end sized for insertion into said second bore, said second bushing member in said expanded state securing said second bushing member in said second bore, said second bushing member also having a mating face including an integral circumferential locking collar and an axially extending opening for receiving said bearing end of said bearing post member therethrough, said opening engaging said first retaining flange preventing separation of said first bushing member from said second bushing member once said bearing post member is inserted therein and also permitting said first bushing member to rotate relative to said second bushing member, said locking collar engaging said locking sleeve.

18. The pivot fastener of claim 17 wherein said bearing post member is formed as a part of said first bushing member.

19. The pivot fastener of claim 17 wherein said bearing post member additionally comprises an anchor portion with an anchor end, said first bushing member also having an axially extending aperture for receiving said anchor end of said bearing post member, said aperture engaging said anchor portion of said bearing post member preventing separation of said bearing post member from said first bushing member.

20. The pivot fastener of claim 17 wherein said bearing post member additionally comprises a second circumferential retaining flange and said opening of said second bushing engages said first and second retaining flanges preventing separation of said first bushing member from said second bushing member once said bearing post member is inserted therein while also permitting said first bushing member to rotate relative to said second bushing member.

* * * * *